US00RE42894E

(19) United States
(12) Reissued Patent
Garneau

(10) Patent Number: US RE42,894 E
(45) Date of Reissued Patent: Nov. 8, 2011

(54) HIGH BREATHABILITY CYCLIST HAND GLOVE

(75) Inventor: Louis Garneau, Saint-Augustin-de-Desmaures (CA)

(73) Assignee: Louis Garneau Sports Inc. (CA)

(21) Appl. No.: 11/640,427

(22) PCT Filed: Jul. 19, 2001

(86) PCT No.: PCT/CA01/01052

§ 371 (c)(1),
(2), (4) Date: Mar. 3, 2003

(87) PCT Pub. No.: WO02/058493

PCT Pub. Date: Aug. 1, 2002

Related U.S. Patent Documents

Reissue of:
(64) Patent No.: 6,845,519
Issued: Jan. 25, 2005
Appl. No.: 10/362,999
Filed: Mar. 3, 2003

U.S. Applications:
(60) Provisional application No. 60/264,015, filed on Jan. 26, 2001.

(51) Int. Cl.
*A41D 19/00* (2006.01)

(52) U.S. Cl. ..... 2/161.1; 2/161.8

(58) Field of Classification Search ..... None
See application file for complete search history.

(56) References Cited

U.S. PATENT DOCUMENTS

| | | | | | |
|---|---|---|---|---|---|
| 3,649,967 | A | * | 3/1972 | Millman | 2/161.3 |
| 4,094,014 | A | * | 6/1978 | Schroeder | 2/161.8 |
| 4,103,362 | A | * | 8/1978 | Blakeman | 2/161.1 |
| 4,519,097 | A | * | 5/1985 | Chappell et al. | 2/16 |
| 4,570,269 | A | * | 2/1986 | Berlese | 2/16 |
| 4,747,163 | A | * | 5/1988 | Dzierson | 2/161.1 |
| 4,748,690 | A | * | 6/1988 | Webster | 2/161.1 |
| 4,945,571 | A | * | 8/1990 | Calvert | 2/467 |
| 5,214,799 | A | * | 6/1993 | Fabry | 2/161.6 |
| 5,276,922 | A | * | 1/1994 | Floyd, Jr. | 2/160 |
| 5,390,372 | A | * | 2/1995 | Hashimoto et al. | 2/161.2 |
| 5,442,816 | A | * | 8/1995 | Seketa | 2/161.7 |

(Continued)

OTHER PUBLICATIONS www.pearlizumi.com, Pearl Izumi Gel Lite Glove.*
www.teamestrogen.com, Pearl Izumi Gel Lite Glove.*

*Primary Examiner* — Katherine Moran
(74) *Attorney, Agent, or Firm* — Cantor Colburn LLP

(57) ABSTRACT

A high-breathability hand glove for use over a bicycle handlebar by a cyclist, said glove including an exposed perforated palm area (12) and a few cushioning pads (16, 18) surrounding said palm area, said cushioning pads (16, 18) being closedly spaced from one another so as to define at least a few air channels being formed radially therebetween, said air channels for evacuating bodily moisture escaping from said perforated palm area, each one of said air channels (20, 22) destined to be narrower than the diameter of the bicycle handlebar so that the bicycle handlebar cannot close said air channels upon the hand globe hand engaging the bicycle handlebar.

32 Claims, 8 Drawing Sheets

U.S. PATENT DOCUMENTS 5,557,803 A * 9/1996 Granich et al. ..... 2/16
5,581,809 A * 12/1996 Mah ..... 2/20
5,603,118 A * 2/1997 Solomon ..... 2/20
5,675,839 A * 10/1997 Gordon et al. ..... 2/159
6,035,444 A * 3/2000 McGrew ..... 2/161.6
6,041,438 A * 3/2000 Kirkwood ..... 2/161.1
6,061,833 A * 5/2000 Smith et al. ..... 2/162
6,098,200 A * 8/2000 Minkow et al. ..... 2/161.1
6,122,769 A * 9/2000 Wilder et al. ..... 2/16
6,216,276 B1 * 4/2001 Eibert ..... 2/161.2
6,618,860 B1 * 9/2003 Sullivan et al. ..... 2/159
2003/0000005 A1 * 1/2003 Faulconer ..... 2/161.1

* cited by examiner

HIGH BREATHABILITY CYCLIST HAND GLOVE

Matter enclosed in heavy brackets [ ] appears in the original patent but forms no part of this reissue specification; matter printed in italics indicates the additions made by reissue.

This application claims priority of provisional application 60/264,015 filed Jan. 26, 2001.

This invention relates to clothing equipment for long-distance cyclists, and in particular to hand gloves with very comfortable features for competition racing cyclists.

BACKGROUND OF THE INVENTION

Racing bicycles usually include a pair of arcuate tubular handlebars, laterally spaced from one another and spacedly overhanging the front wheel of the bicycle. Each handlebar carry a finger actuatable brake lever assembly, mounted at the foremost web of the handlebar and connected by a brake cable to a brake pad in transverse register with the rim of a corresponding one of the two wheels of the bicycle. These two fore and aft extending handlebars merge with a transverse tubular bar forming an integral fore part of the stem of the bicycle main frame.

When the bicycle is in motion, these handlebars are to be grasped by the two hands of the cyclist. It is critical that the cyclists hands have a good command and control of the handlebars, as they are provide inter alia for directional control of the vehicle, center of gravity stability control of the cyclist and bicycle assembly, proper positioning and access for actuating the wheel braking system if need arises. However, as the cyclist pedals to maintain the bicycle in motion in upright dynamic stability condition over ground, corresponding muscular exercise is generated, and thus bodily heat and perspiration levels increase. In particular, perspiration levels tends to increase substantially at the ends of the limbs, i.e. at the feet and hands.

Cyclists that ride racing bicycles for competition, and especially for long-distance "marathon" type tracks, tend to use hand gloves for improved comfort. Some of these hand gloves include pads inside the palm of the glove for comfort cushioning between the palm of the hand and the handle bar. Others include perforated mesh material that allow free escape and release of moisture from the hand palm perspiration.

However, an inconvenience of these hand gloves is that when the gloves engage the handlebar, the perforations in the central palm glove portions in direct contact with the handlebar are in effect undesirably sealed, thus preventing the escape and release of moisture through the glove mesh material at the palm center portion thereof. Unfortunately, that is where moisture build-up tends to be most acute.

OBJECT OF THE INVENTION

An object of the invention is therefore to improve comfort of cyclists wearing hand gloves, by providing a glove that has features preventing sealing of the palm moisture-release perforations thereof when the handle glove grasps the bicycle handlebar.

SUMMARY OF THE INVENTION

In accordance with the object of the invention, there is disclosed a high-breathability hand glove for use over a bicycle handlebar by a cyclist, said glove comprising: a) a main body made from a flexible sheet material for wrap-around a cyclist hand, said main body including an exposed central palm area; b) at least a few air and moisture circulation apertures made through said central palm area; c) at least one cushioning pad, made from a soft material and fixedly applied against said main body adjacent to but spacedly from said exposed central palm area thereof, said pad being much thicker than said main body sheet material; and d) an air channel member, merging with said palm area and opening outwardly of said cushioning pad, said air channel member forming both a fresh air intake port for providing outside air toward said palm area, and a moisture outlet from bodily moisture escaping outwardly from said palm area; wherein said air channel member cooperates with said at least one cushioning pad in preventing accidental sealing of said aperture of said palm area upon grasping engagement of said glove around the bicycle handlebar.

Preferably, said at least one cushioning pad is made from a partly compressible material, for example closed cell foam.

In a first embodiment of the invention, it would be envisioned that there would be two separate pads, each of irregular U-shape and closely spaced from one another, and wherein said air channel member is defined by an X-shape passageway defined between said two separate pads, the width of said passageway destined to be larger than the diameter of the bicycle handlebar. At least some of said apertures in said palm area could be ovoidal in shape.

In an alternate embodiment of the invention, there could be three generally equidistant separate cushioning pads closely spaced from one another, and wherein said air channel member is defined by generally T-shape passageways defined between said three separate pads, the width of said passageway destined to be larger than the diameter of the bicycle handlebar.

In still another embodiment of the invention, there could be four generally equidistant separate cushioning pads closely spaced from one another, and wherein said air channel member is defined by generally cross-shape passageways defined between said four separate pads, the width of said passageways destined to be larger than the diameter of the bicycle handlebar.

Preferably, the thickness of said at least one cushioning pad ranges between 1 and 13 mm, most preferably between 3 to 6.5 mm, with a minimum of 1 mm after compression.

The surface area of said exposed central palm area could range between 0.5 to 1,500 square mm, preferably between 10 to 500 square mm, and most preferably be of a value of about 3 square mm.

The invention also relates to a high-breathability hand glove for use over a bicycle handlebar by a cyclist, said glove comprising: a) a main sheet body for wrap-around a cyclist hand, said main body including a central palm area; b) first channel means, integral to said central palm area for enabling both bodily moisture escape from said central palm area and fresh air intake into said central palm area; c) at least one cushioning pad, made from a soft material and fixedly applied against said main body adjacent to but spacedly from said central palm area thereof, said pad being much thicker than said main sheet; and d) second channel means, merging with said first channel means and opening outwardly of said cushioning pad, said second channel member forming both a fresh air intake port, for providing outside air to said first channel means, and a moisture outlet from enabling escape of moisture coming from said first channel means; wherein said second channel member means cooperates with said at least one cushioning pad in preventing accidental deactivation of said first channel upon hand grasping engagement of said glove around the bicycle handlebar.

Said first channel means could then consist of at least a few two-way air and moisture circulation apertures made through said central palm area, said palm area remaining constantly exposed during use.

There could also for example be at least two separate pads, each closely spaced from one another. Said second channel means could then be defined by a passageway defined between said at least two separate pads and opening outwardly thereon, the width of said passageway destined to be larger than the diameter of the bicycle handlebar.

DETAILED DESCRIPTION OF THE EMBODIMENTS OF THE INVENTION

Figure 1:
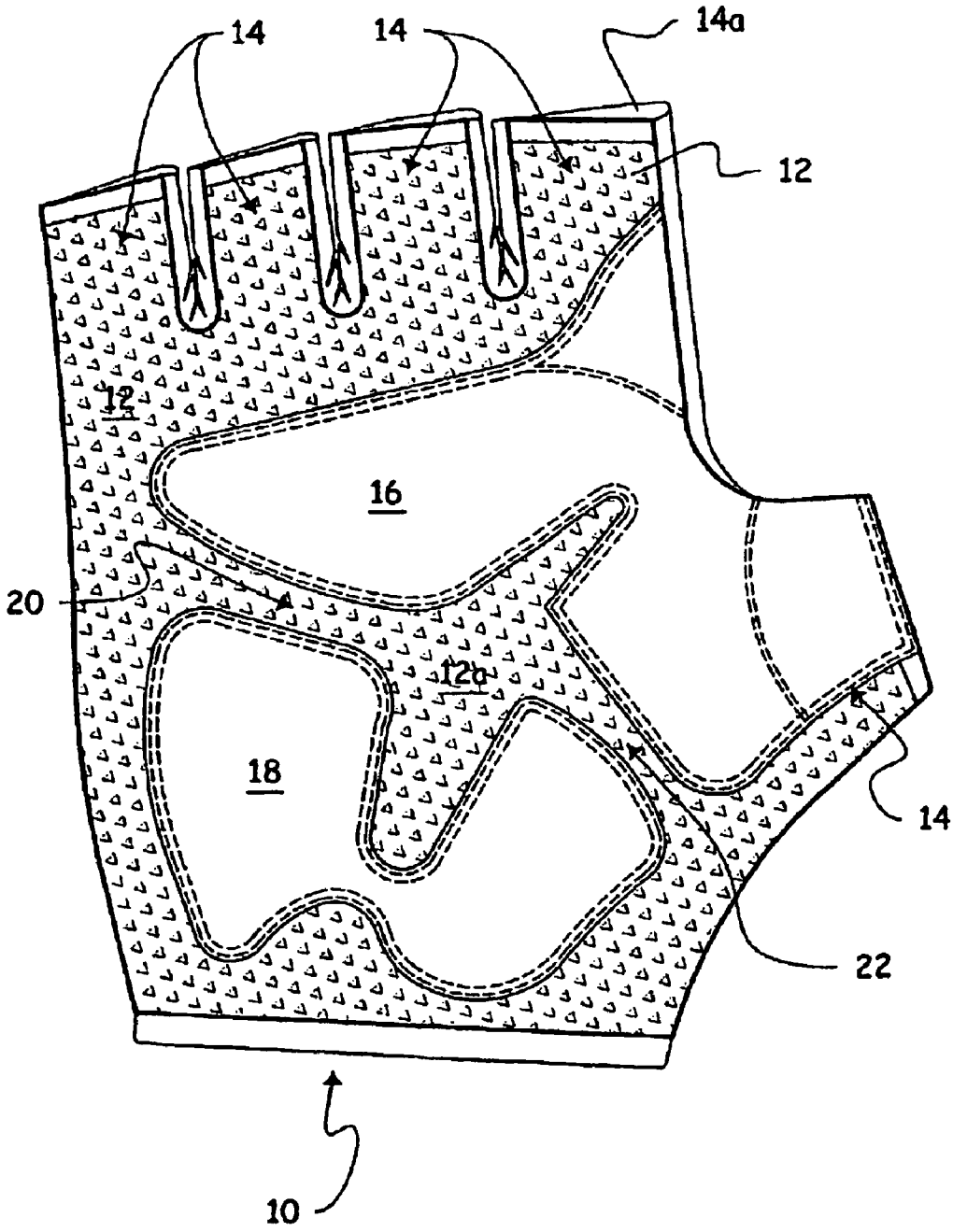
FIG. 1 is a plan view of the palm portion of a first embodiment of cyclist glove, showing the peripheral cushion pads, main mesh material and radial air channels.
Figure 6:
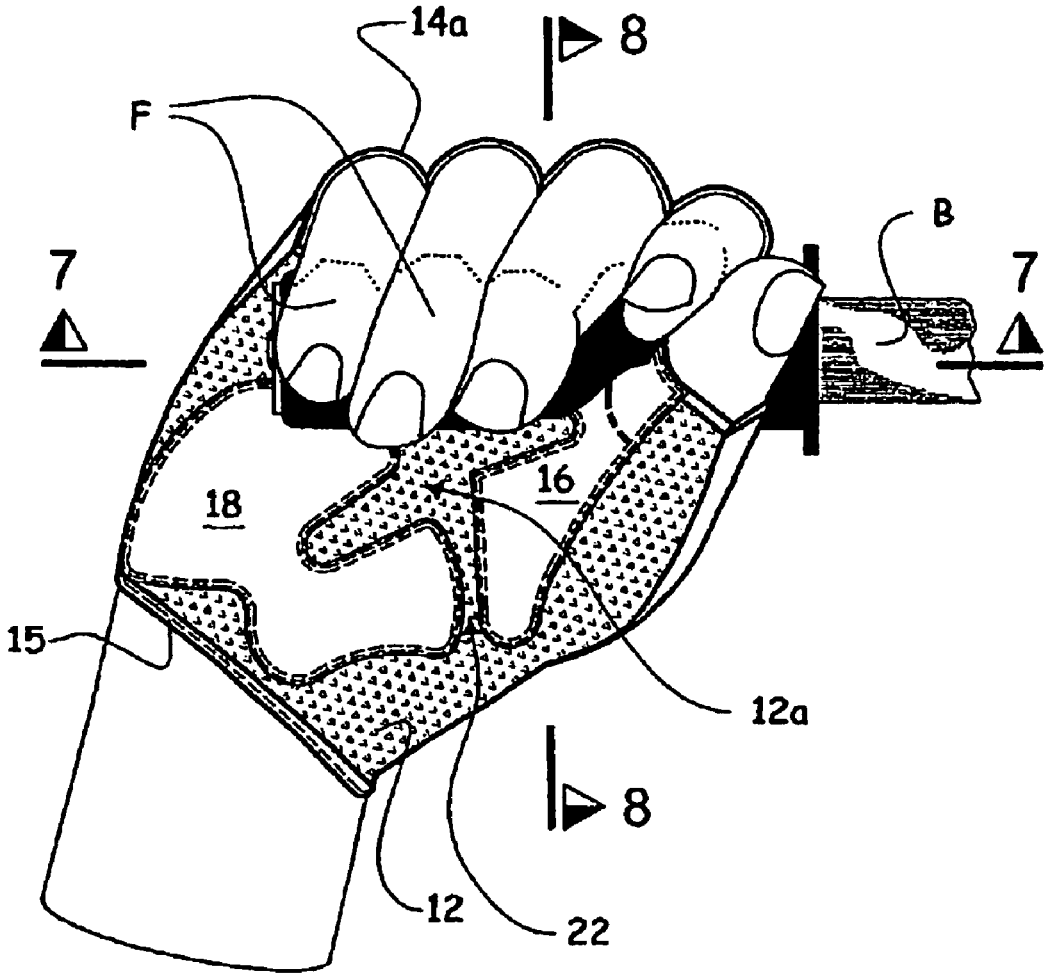
FIG. 6 is an elevational view of a cyclist hand grasping a porton of a bicycle handlebar, with the cyclist wearing the first embodiment of hand glove of FIG. 1.

The racing cyclist hand glove 10 of FIG. 1 is made as a main element from mesh material 12, i.e. a synthetic or fabric-like perforate flexible material whose perforation units are each of a size and shape enabling free bodily heat release therethrough from the hand as well as free humidity escape therethrough from the hand. The perforation features of the glove mesh material 12 are of conventional nature. The five fingers 14 of the hand glove 10 are cut at the second phalanx, as is known in the trade, so that the finger tips F (FIG. 6) be free of the mesh material and be able to freely engage the bicycle handlebar B. The finger portions 14 of the hand glove 10 are preferably lined with the synthetic material LYCRA (TM). A hook and loop fastener band assembly 15 (VELCRO-TM) may releasably close in a loop the wrist end of the hand glove around the wrist of the cyclist. Overlock stitches form the annular ends of each open finger end portion mouth 14A.

In the first embodiment of glove shown in FIG. 1 as 10, two irregularly U-shape thick cushion hand palm pads 16, 18, are mounted onto the main perforated sheet mesh material 12, peripherally to the central mesh portion free of cushion pad, so that an irregularly shaped star shaped mesh section 12a be formed at the palm portion of the hand glove. Star mesh section 12a opens freely at two opposite ends into the main sheet mesh material 12, along air channels 20, 22. It is noted that the width of air channels 20, 22, should be smaller than the diameter of the bicycle handle bar, i.e. that the opposite registering ends of palm pads 16, 18, while being spaced from one another, should be sufficiently close to prevent the bicycle handlebar to enter into contact with the mesh material in either the central palm portion 12a or in air channels 20, 22 when engaging the handlebar. In this way, the air channels 20, 22, remain constantly open, whether the cyclists grasps the handlebar or not, thus ensuring that moisture generated by perspiration at the hand palm area will not become trapped by the hand glove when the cyclist grasps the bicycle handlebar, but will rather freely escape from the glove through central mesh palm portion 12a and in between the two pads 16, 18, across air channels 20, 22.

Although the main sheet material of the hand glove 10 is preferably shown as being 100% mesh perforated flexible sheet material, the perforated mesh sheet material could alternately be limited to the central X-shape palm area 12a and along air channels 20, 22, while the remaining glove flexible sheet material peripherally of the cushioning pads could be made from non perforated sheet material.

What is important here is that there be a differential thickness between the thin central X-shape mesh palm area 12a, 20, 22, and the thick peripheral cushioning pads 16, 18.

Preferably, the cushioning pads 16, 18, will be made from a partly compressible material, for added comfort, for example, a closed cell foam. Alternately however, the cushioning pads 16, 18, could be made from a substantially incompressible soft material, for example, a bundle of fabric.

The thickness of the pads 16, 18, may vary for example between 1 and 13 millimeters (mm), but preferably in the range of approximately 3 to 6.5 mm.

The surface area of the exposed star-shape mesh palm area 12a, 20, 22, may vary for example between 0.5 to 1,500 mm2, but preferably in the range of 1 to 500 mm2, and most preferably of about 3 mm2.

With the present hand glove assembly, the following advantages are obtained:

- improved dynamic palm hand cooling, in particular when the cyclist is in motion over his bicycle;
- faster drying of the hand glove, if wet from perspiration borne moisture;
- constant escape of perspiration borne moisture from the hand palm area;
- constant cooling fresh air intake availability; and
- improved overall breathability of the hand glove.

Figure 2:
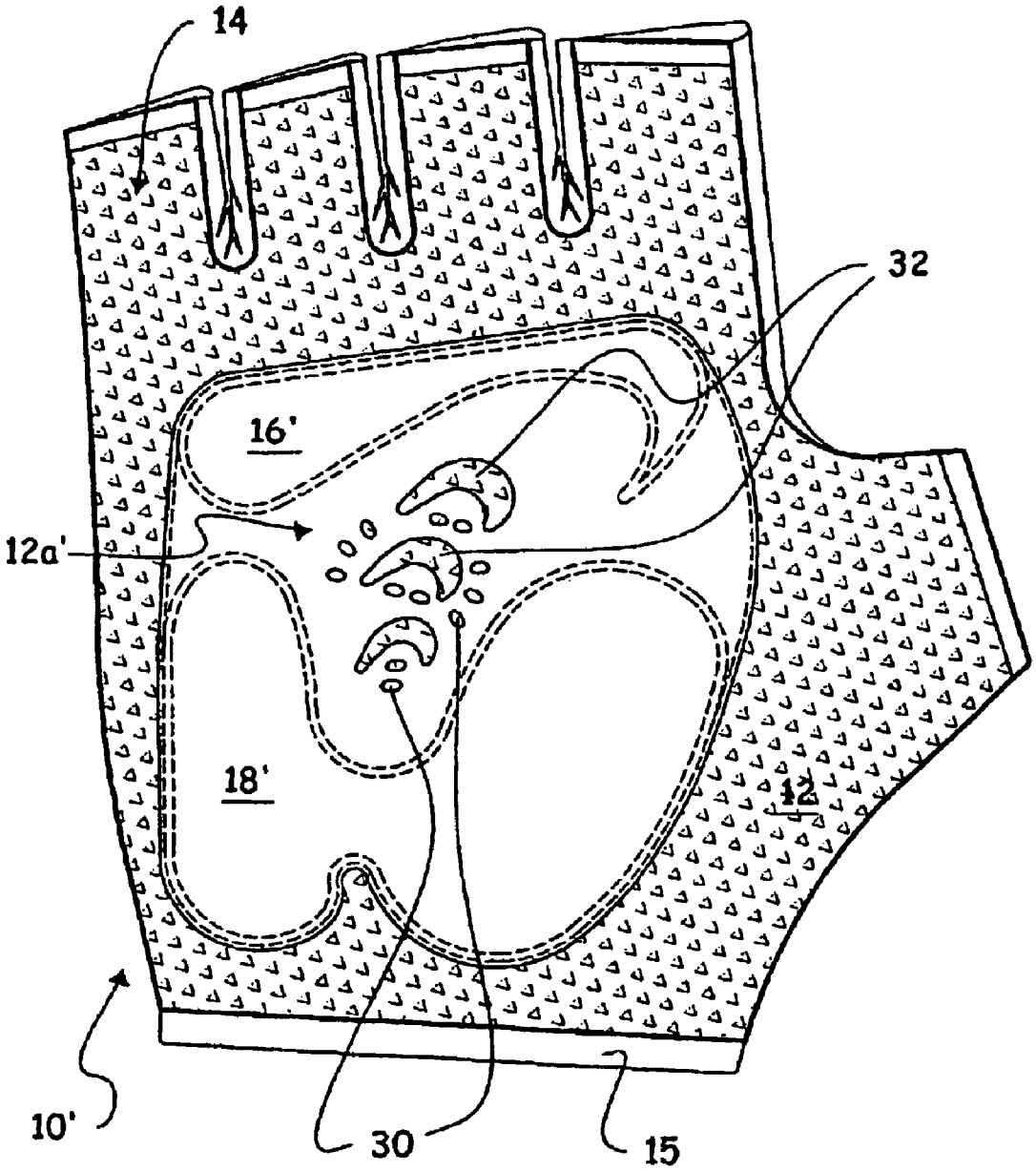
FIGS. 2–5 are views similar to FIG. 1, but showing second, third, fourth and fifth embodiments respectively of the cyclist glove.

In the second glove 10' of FIG. 2, the palm area 12a' is lined with a large generally U-shape lower pad 16' and a much smaller arcuate upper pad 18'. Palm area 12a' in between the two pads 16', 18', is formed of a non perforated sheet material, but includes a number of central large apertures 30, 32. Apertures 30, 32, are larger than the unit perforation in the main mesh material of the glove, with apertures 30 being generally circular while largest apertures 32 are ovoidal and preferably arcuate as shown. Apertures 30, 32, allow free heat release and moisture escape from the palm area of the glove, as in the first embodiment. Again, as in the first embodiment, the opposite facing ends of pads 16', 18', should be spaced to form therebetween an air channel for escape of the heat and moisture, but sufficiently close so as to prevent the bicycle handle bar to undesirably come into sealing contact with the central apertures 30, 32.

A leather lining 33 (FIG. 7), for example, Amara leather, may be provided to cover the cushion pads 16', 18'.

Figure 3:
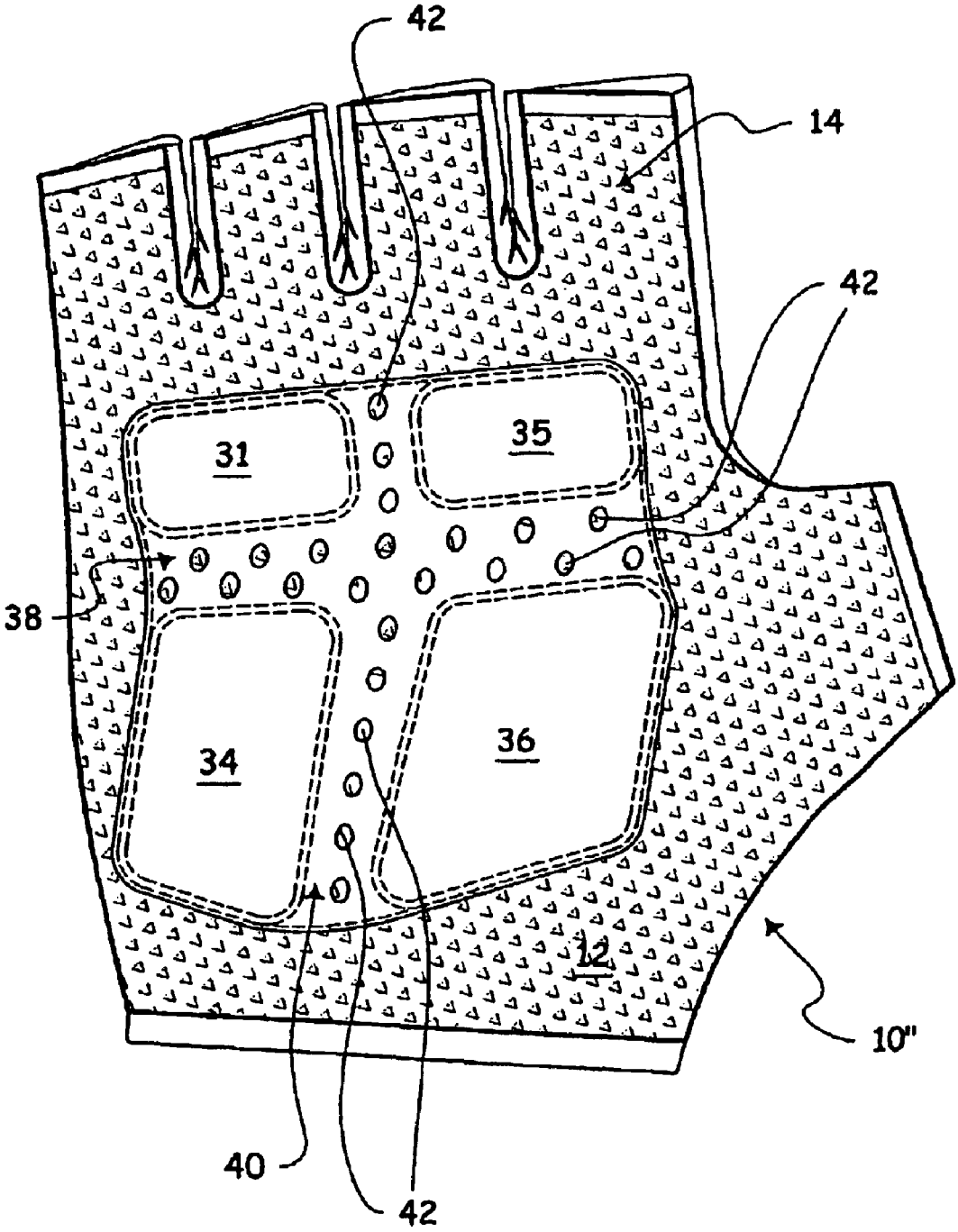

In the third embodiment of cyclist glove illustrated as 10" in FIG. 3, there are provided four quadrangular pads 31, 35, 34, 36, positioned at corresponding corners of the palm area of the glove and spaced from one another. Two separate air channels 38, 40, are therefore formed at right angle to one another, at the palm area in between the respective pads 31, 35, 34, 36. The two air channels 38, 40, define in total four separate moisture escape outlets and/or fresh air intake ports. The main sheet material of glove 10" inside air channels 38, 40, may or may not be perforated mesh, but preferably include a number of oversized circular apertures 42. The number of apertures 42 may be for example between 10 and 30. Preferably, the two upper pads 31, 35, are smaller in size than the two lower pads 34, 36, for minimizing flexing discomfort when the glove is inserted into a cyclist hand. Again as in the other embodiments of glove according to the present invention, the width of the transverse air channel 38 and thus the distance between the top pads 31, 35, and the bottom pads 34, 36, must be smaller than the diameter of the bicycle handlebar, so as to prevent accidental handlebar borne sealing of the apertures 42 inside the transverse air channel 38.

Figure 4:
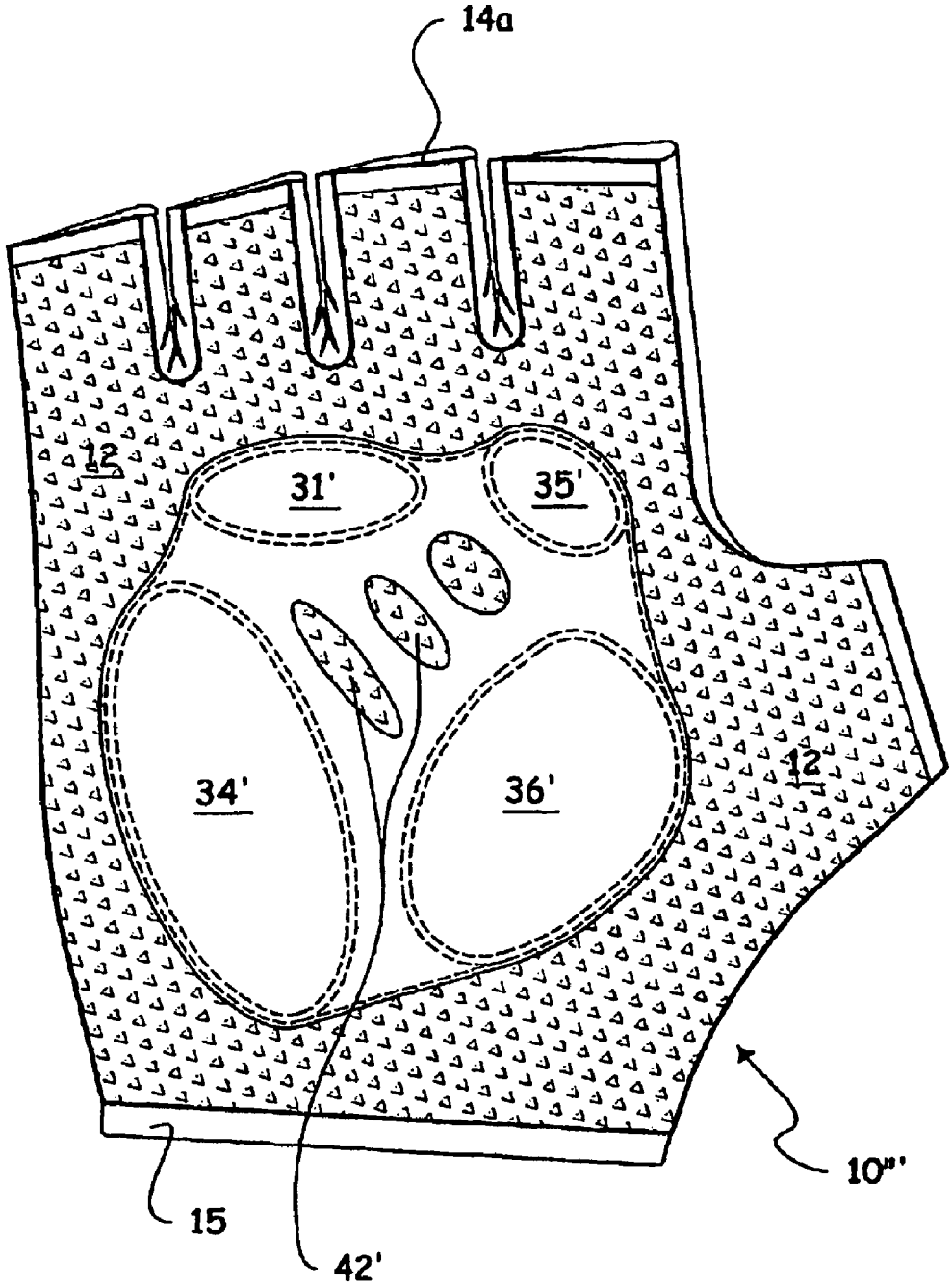
Figure 5:
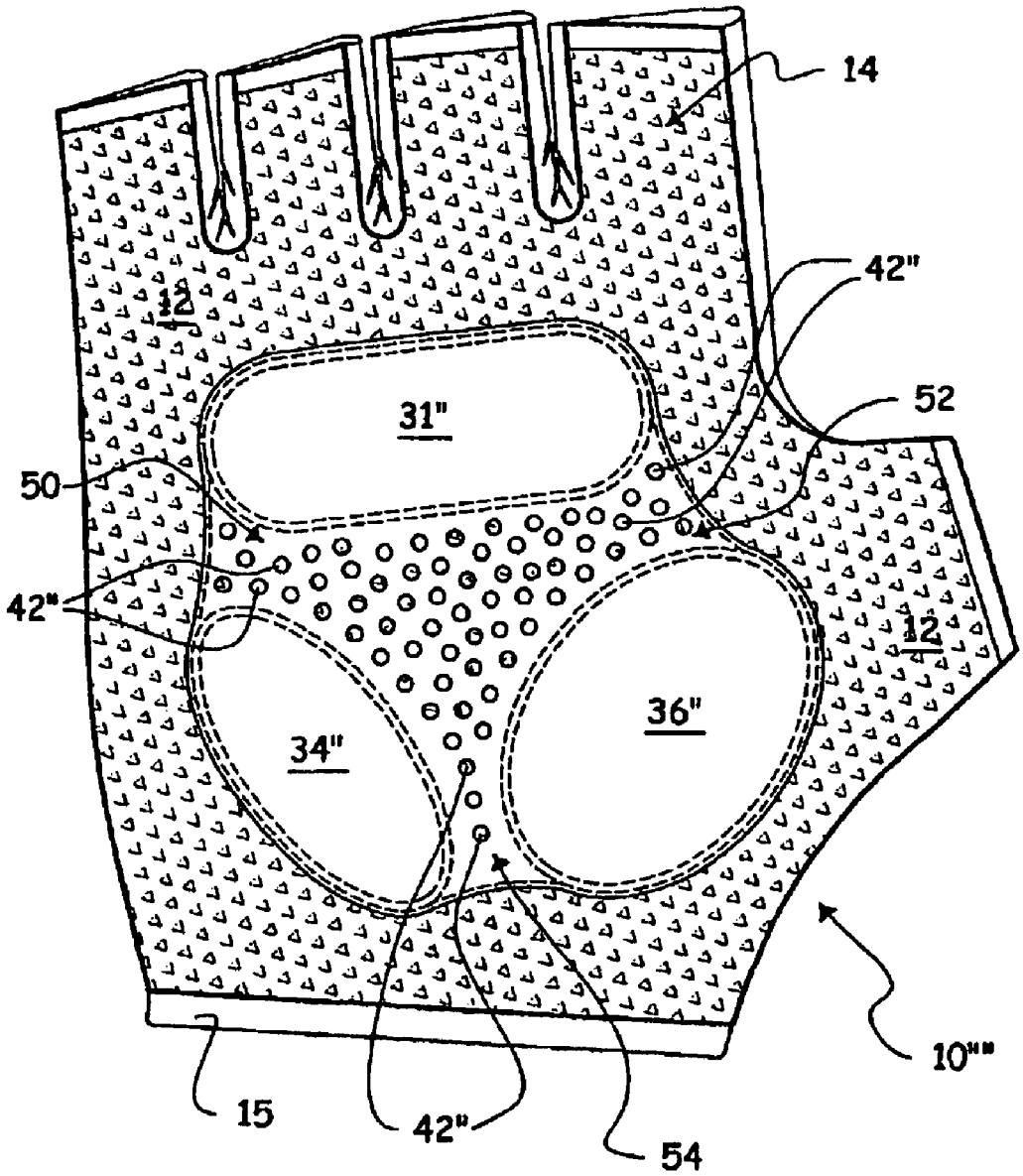

In the fourth embodiment of cyclist glove illustrated as 10''' in FIG. 4, the two upper smaller pads 31', 35', and the two lower larger pads 34', 36', are generally ovoidal in shape. A few oversized ovoidal apertures, 42', for example three apertures 42' as shown in the drawings, are provided within the palm area circumscribed in between the four pads 31', 35', 34', 36'. Otherwise, the features and advantages are the same as with the third embodiment of glove in FIG. 3. In the fifth embodiment of glove illustrated as 10'''' in FIG. 5, there are shown an upper rounded rectangular cushion pad 31'', and two lower ovoidal cushion pads 34'' and 36''. A plurality of oversized circular apertures 42'' are made inside the palm area of the glove circumscribed by the three pads 31'', 34'', 36''. Here, three different air channels 50, 52, 54, are formed peripherally in between successive pairs of the pad trio 31'', 34'', 36''. Again, the distance between the top pad 31'' and the two lower pads 34'' and 36'', and thus the width of upper air channels 50, 52, should be smaller than the diameter of the handlebar section onto which the glove wearing cyclist hand is coming in contact, so as to positively prevent accidental sealing of at least a number of the moisture release apertures 42''.

Figure 7:
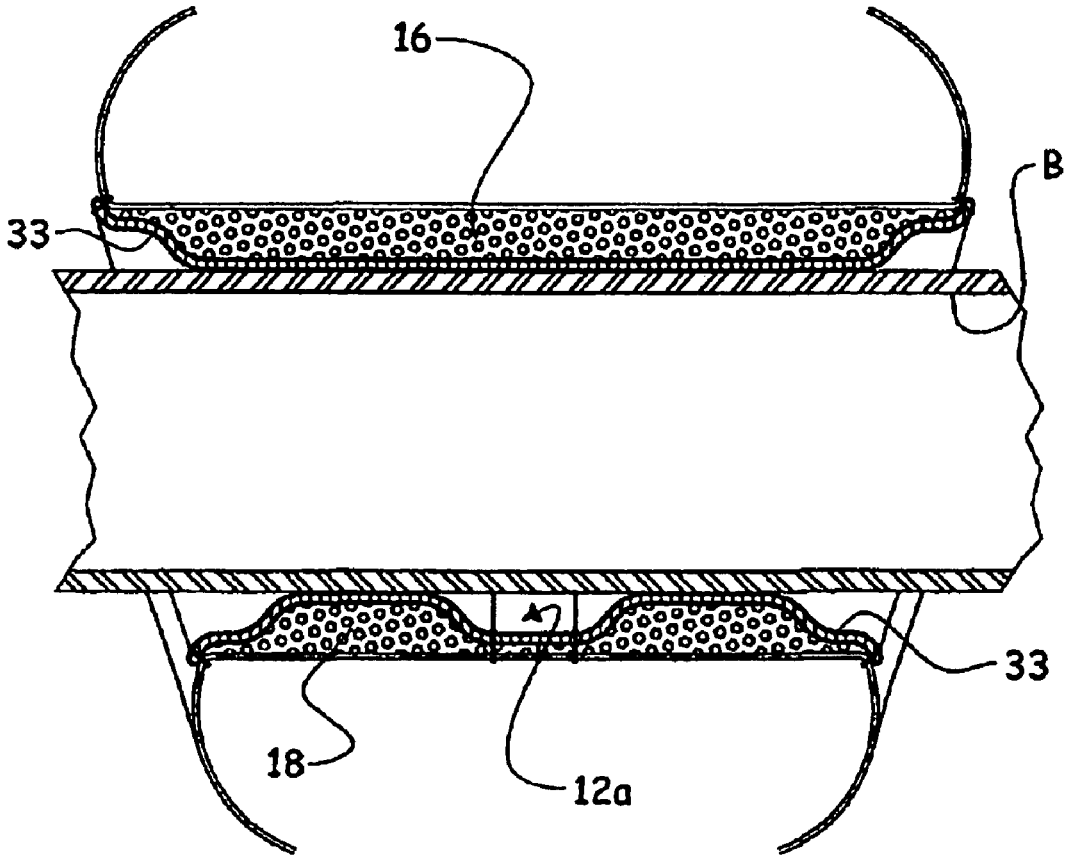
FIGS. 7 and 8 are enlarged cross-sectional views taken along lines 7—7 and 8—8 respectively of FIG. 6.
Figure 8:
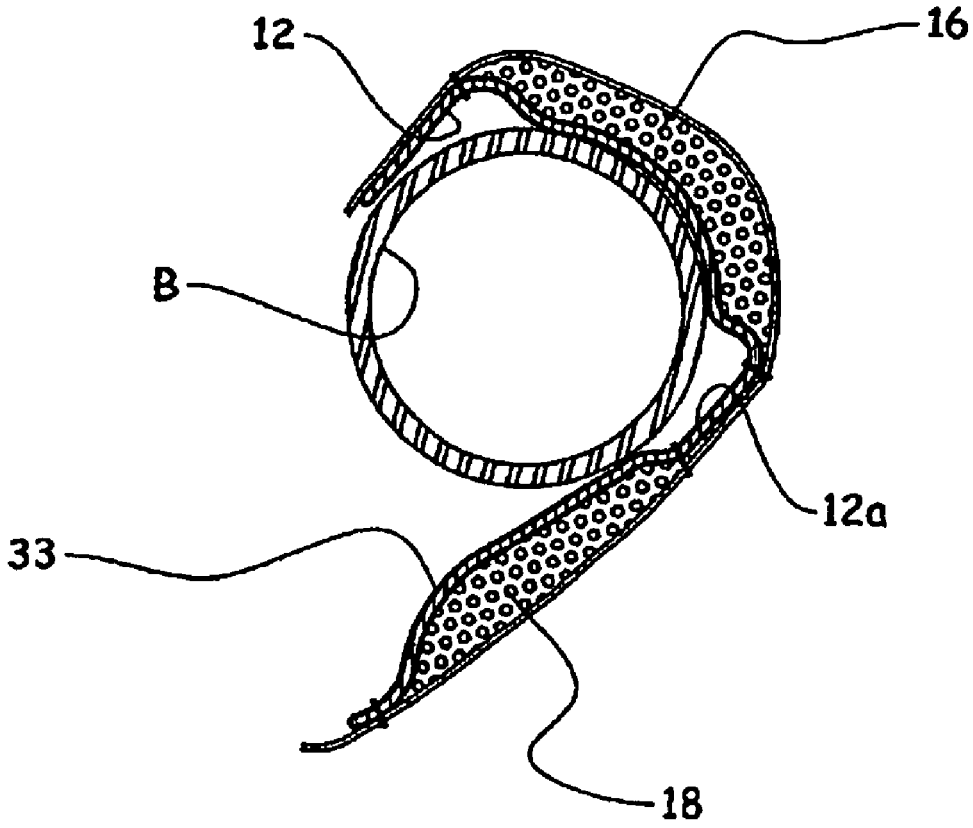

FIGS. 7 and 8 suggest that although the cushioning pads may be partly compressed against the handlebar B by the cyclist hand grasping the handlebar B with glove 10 (10', . . . ) there remain the air channels 20, 22 that maintain a spacing gap between the handlebar and the hand glove main sheet mesh 12a.

Obviously, the number, size and shape of the cushion pads and of the moisture release apertures or air channels could vary in still other alternate cyclist gloves, without restricting the scope of the present invention. Other gloves could be envisioned, not illustrated in the drawings. For example, in another alternate embodiment of cyclist glove, not shown, there is formed through the band palm cushion a generally straight-U (or alternately V-shape) single notch, this notch extending approximately parallel to the thumb and opening downwardly at the wrist portion of the glove. The main perforate mesh material bridges the gap formed by the notch. In still another alternate embodiment of cyclist glove, not illustrated, there is provided four smaller separate hand palm cushions, generating therebetween an approximately H-shape thinning. In the H-shape thinning, only the perforate mesh remains to bridge the gaps between adjacent palm cushions.

I claim:

1. A high breathability hand glove for use over a bicycle handlebar by a [cyclist] *cyclist's*, said glove comprising:

a) a main body made from a flexible sheet material for wrap-around a [cyclist] *cyclist's* hand, said main body including a central palm area;

b) a number of air and moisture circulation apertures made through said central palm area;

c) at least one cushioning pad made from a soft material and fixedly applied against said main body adjacent to but [spacedly] *spaced* from said central palm area thereof said cushioning pad clearing said central palm area wherein said central palm area is thus exposed, said pad being much thicker than said main body sheet material; and d) an air channel member, merging with said exposed palm area and opening outwardly [or] *of* said cushioning pad, said air channel member forming both a fresh air intake port for providing outside air toward said palm area, and a moisture outlet from bodily moisture escaping outwardly from said palm area;

wherein said air channel member cooperates with said at least one cushioning pad in preventing accidental sealing of said apertures of said exposed palm area upon grasping engagement [at] *of* said glove around the bicycle handlebar; and wherein said at least one cushioning pad includes a first pad and a second pad, said each first pad and *second pad being* of irregular U-shape and closely spaced from one another, and wherein said air channel member is defined by an X-shape passageway defined between said (two separate) first pad and second pad, the width of said passageway designed to be smaller than the diameter of the bicycle handlebar.

2. A cyclist hand glove as in claim 1, wherein said at least one cushioning pad is made from a compressible yet resilient material.

3. A cyclist hand glove as in claim 2, wherein said cushioning pad is made from closed cell foam.

4. A cyclist hand glove as in claim 1, wherein at least some of said apertures in said palm area are ovoidal in shape.

5. A high-breathability hand glove for use over a bicycle handlebar by a cyclist, said glove comprising:

a) a main body made from a flexible sheet material for wrap-around a cyclist hand, said main body including a central palm area;

b) a number of air and moisture circulation apertures made through said central palm area;

c) at least one cushioning pad made from a soft material and fixedly applied against said main body adjacent to but [spacedly] *spaced* from said central palm area thereof, said cushioning pad clearing said central palm area wherein said central palm area is thus explosed said pad being thicker than said main body sheet material; and d) an air channel member, merging with said exposed palm area and opening outwardly of said cushioning pad, said air channel member forming both a fresh air intake port for providing outside air toward said palm area, and a moisture outlet from bodily moisture escaping outwardly from said palm area;

wherein said air channel member cooperates with said a least one cushioning pad in preventing accidental sealing of said apertures of said exposed palm area upon grasping engagement of said glove around the bicycle handlebar; and wherein there are four generally equidistant separate cushioning pads closely spaced from one another and wherein said air channel member is defined by generally cross-shape passageways defined between said four separate pads, said glove for use with a bicycle handlebar having a diameter larger than the width of at least one of said passageways.

6. A cyclist hand glove as in claim 1, wherein the thickness of said at least one cushioning pad ranges between 1 and 13 mm.

7. A cyclist hand glove as in claim 6, wherein the thickness of said at least one cushioning pad ranges between 3 to 6.5 mm.

8. A high-breathability hand glove for use over a bicycle handlebar by a cyclist, said glove comprising:

a) a main body made from a flexible sheet material for wrap-around a cyclist hand, said main body including an exposed central palm area;

b) a number of air and moisture circulation apertures made through said central palm area;

c) at least one cushioning pad made from a soft material and fixedly applied against said main body adjacent to but [spacedly] *spaced* from said exposed central palm area thereof said pad being much thicker than said main body sheet material; and d) an air channel member merging with said palm area and opening outwardly of said cushioning pad said air channel member merging forming both a fresh air intake port for providing outside said toward said palm area and a moisture outlet from bodily moisture escaping outwardly from said palm area;

said air channel member cooperating with said at least one cushioning pad in preventing accidental sealing of said apertures of said palm area upon grasping engagement of said glove around the bicycle handlebar; and wherein there are two separate pads, each *of* irregular U-shape and closely spaced from one another and wherein said air channel member is defined by an X-shape passageway designed to be smaller than the diameter of the two separate pads, the width of said passageway designed to be smaller than the diameter of the bicycle handlebar.

9. A high-breathability hand glove for use over a bicycle handlebar by a [cyclist] *cyclist's*, said glove comprising:

a) a main body made from a flexible sheet material for wrap-around a [cyclist] *cyclist's* hand, said main body including an exposed central palm area;

b) a number of air and moisture circulation apertures made through said central palm area;

e) at least one cushioning pad made from a soft material and fixedly applied against said main body adjacent to but [spacedly] *spaced* from said exposed central palm area thereof, said pad being much thicker than said main body sheet material; and d) an air channel member merging with said palm area and opening outwardly or said cushioning pad said air channel member forming both a fresh air intake port for providing outside air toward said palm area and a moisture outlet from bodily moisture escaping outwardly from said palm area;

said air channel member cooperating with said at least one cushioning pad in preventing accidental sealing of said apertures of said palm area upon grasping engagement of said glove around the bicycle handlebar;

wherein there are four generally equidistant separate cushioning pads closely spaced from one another and wherein said air channel member is defined by generally cross-shape passageways defined between said four separate pads, said glove for use with a bicycle handlebar having a diameter larger than the width of at least one of said passageways.

*10. A high breathability hand glove for use over a bicycle handlebar by a cyclist, the glove comprising:*

*a) a main body made from a flexible sheet material for wrapping around a cyclist's hand, the main body including a central palm area;*

*b) a plurality of air and moisture circulation apertures made through the central palm area;*

*c) at least one cushioning pad fixedly applied against the main body adjacent to but spaced from the central palm area, the cushioning pad including a compressible and resilient material, the cushioning pad disposed generally peripheral to the central palm area wherein the central palm area is thus exposed; and*

*d) an air channel merging with the exposed palm area and opening outwardly of the cushioning pad, the air channel forming both a fresh air intake port for providing outside air toward the palm area, and a moisture outlet for moisture escaping outwardly from the palm area;*

*wherein the air channel cooperates with the at least one cushioning pad in preventing accidental sealing of the apertures of the exposed palm area upon grasping engagement of the glove around the bicycle handlebar; and*

*wherein the at least one cushioning pad includes a first pad and a second pad closely spaced from one another, wherein the air channel is defined by a passageway defined between the first pad and second pad and wherein the first and second pads comprise respective sidewalls and upper surfaces at edges of the sidewalls elevated from the flexible sheet material of the main body, the upper surfaces being disposed to contact the bicycle handlebar upon said grasping engagement and the first and second pads being responsively deformable such that the apertures in the central palm area are maintained at a distance from the upper surfaces.*

*11. A hand glove as in claim 10, wherein the first and second pad protrude from the flexible sheet of the main body and wherein the central palm area is inset relative to the first and second pads.*

*12. A hand glove as in claim 11, wherein the passageway is inset relative to the first and second pads.*

*13. A hand glove as in claim 12 wherein the first and second pads protrude in a direction generally perpendicular to a plane of the flexible sheet of the main body and wherein the central palm area and the passageway extend across a portion of the plane of the flexible sheet, which is located between the first and second pads such that the passageway is maintained in an open configuration during the grasping engagement.*

*14. A hand glove as in claim 12, wherein the passageway is delimited by the sidewalls and a bottom surface extending between the sidewalls.*

*15. A hand glove as in claim 11, wherein a degree of protrusion of the first and second pads is sufficiently defined such that the first and second pads are disposed to contact the bicycle handle bar upon said grasping engagement with at least a portion of the central palm area maintained in a position proximate to and not in contact with the bicycle handlebar.*

*16. A hand glove, comprising:*

*a main body, through which a perforation is defined, for wrapping a hand;*

*a sheet material disposed on an area of the main body corresponding to a location of the perforation, the sheet material being formed to define an aperture exposing the perforation as an air inlet and a moisture outlet;*

*a first compressible and resilient cushioning pad applied to one of the main body and the sheet material at a position spaced from the aperture, the first cushioning pad including a first sidewall; and*

*a second compressible and resilient cushioning pad applied to one of the main body and the sheet material at a position spaced from the aperture, the second cushioning pad including a second sidewall, wherein*

*the first and second sidewalls face the aperture in respective directions to define a channel bound by the first and second sidewalls and the surface of the sheet material at a location of the aperture, and*

*during a grasping engagement or the hand with a bar, a surface of the bar, the first and second sidewalls and the surface of the sheet material at the location of the aperture cooperatively bound a passageway open to the aperture.*

*17. The hand glove according to claim 16, wherein the sheet material is formed to define the aperture as being circular.*

*18. The hand glove according to claim 16, wherein the sheet material is formed to define the aperture as being ovoidal and arcuate.*

*19. The hand glove according to claim 16, further comprising a leather lining to respectively cover the first and second cushioning pads.*

*20. The hand glove according to claim 16, further comprising third and fourth cushioning pads, each of the first through fourth cushioning pads being quadrangular and positioned at corners of a palm area of the main body.*

*21. The hand glove according to claim 20, wherein the channel is defined as two air channels at right angles to one another.*

*22. The hand glove according to claim 21, wherein the aperture is plural in number and includes 10-30 apertures.*

*23. The hand glove according to claim 21, wherein a width of a transverse one of the air channels is smaller than a diameter of the bar.*

*24. The hand glove according to claim 16, further comprising third and fourth cushioning pads, each of the first through fourth cushioning pads being ovoidal and positioned at corners of a palm area of the main body.*

*25. The hand glove according to claim 24 wherein two upper ones of the cushioning pads are smaller than two lower ones.*

*26. The hand glove according to claim 16, further comprising a third cushioning pad, one of the cushioning pads being an upper rounded rectangular cushioning pad and the others being lower ovoidal cushioning pads.*

*27. A cycling hand glove, comprising:*

*a main body for wrapping a hand and including an aperture extending through the main body as an air inlet and a moisture outlet;*

*a first compressible and resilient cushioning pad applied to the main body at a position spaced from the aperture, the first cushioning pad including a first sidewall and a first upper surface elevated from the main body; and*

*a second compressible and resilient cushioning pad applied to the main body at a position spaced from the aperture, the second cushioning pad including a second sidewall and a second upper surface elevated from the main body, wherein*

*the first and second sidewalls being spaced apart to define a channel bound by the first and second sidewalls and the surface of the sheet material at a location of the aperture, and*

*during a grasping engagement of the hand with a bar, a surface of the bicycle handlebar, the first and second sidewalls and the surface of the sheet material at the location of the aperture cooperatively bound a passageway open to the aperture.*

*28. The hand loye according to claim 27, wherein the aperture is plural in number and includes more than three apertures.*

*29. The hand glove according to claim 27, wherein a narrowest width of the channel is smaller than a diameter of the handlebar.*

*30. The hand glove according to claim 27, wherein the cushioning pads have a surface area larger than a surface area of the aperture.*

*31. The hand glove according to claim 27, wherein the main body is mesh material.*

*32. The hand glove according to claim 27, wherein the apertures is located in a central palm area, the first cushioning pad is positioned above the central palm area towards finger portions of the hand glove, and the second cushioning pad is positioned below the central palm area towards a wrist section of the hand glove.*

* * * * *